(12) United States Patent
Kanno

(10) Patent No.: US 8,708,234 B2
(45) Date of Patent: Apr. 29, 2014

(54) IC TAG COMMUNICATION APPARATUS

(75) Inventor: Hiroyuki Kanno, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 13/293,468

(22) Filed: Nov. 10, 2011

(65) Prior Publication Data

US 2012/0118958 A1 May 17, 2012

(30) Foreign Application Priority Data

Nov. 11, 2010 (JP) .................................. 2010-252618

(51) Int. Cl.
*G06K 7/00* (2006.01)

(52) U.S. Cl.
USPC .......................................... 235/439

(58) Field of Classification Search
USPC ................. 235/451, 492, 483, 486, 375, 439; 283/81; 340/572.1, 572.7
See application file for complete search history.

(56) References Cited

U.S. PATENT DOCUMENTS

| | | | | |
|---|---|---|---|---|
| 5,003,325 | A * | 3/1991 | Bibl | 346/136 |
| 6,079,814 | A * | 6/2000 | Lean et al. | 347/55 |
| 6,104,291 | A * | 8/2000 | Beauvillier et al. | 340/572.1 |
| 6,899,476 | B1 * | 5/2005 | Barrus et al. | 400/76 |
| 7,602,295 | B2 * | 10/2009 | Suzuki | 340/572.1 |
| 2005/0058483 | A1 * | 3/2005 | Chapman et al. | 400/76 |
| 2006/0001526 | A1 * | 1/2006 | Murofushi et al. | 340/10.1 |
| 2006/0220859 | A1 * | 10/2006 | Nagai et al. | 340/572.1 |
| 2008/0231416 | A1 * | 9/2008 | Marlett et al. | 340/5.1 |
| 2009/0152353 | A1 * | 6/2009 | Tsirline et al. | 235/439 |
| 2009/0231142 | A1 * | 9/2009 | Nikitin et al. | 340/572.8 |
| 2012/0038727 | A1 * | 2/2012 | Kuribayashi et al. | 347/104 |

FOREIGN PATENT DOCUMENTS

JP 2007-203487 8/2007

* cited by examiner

*Primary Examiner* — Tuyen K Vo
(74) *Attorney, Agent, or Firm* — Kubotera & Associates LLC

(57) ABSTRACT

An IC (Integrated Circuit) tag communication apparatus is capable of transporting a medium with an IC tag along a transportation path and communicating with the IC tag. The IC tag communication apparatus includes an antenna portion for communicating with the IC tag. Further, the transportation path includes a low dielectric region arranged to face the antenna portion.

9 Claims, 10 Drawing Sheets

IC TAG COMMUNICATION APPARATUS

BACKGROUND OF THE INVENTION AND RELATED ART STATEMENT

The present invention relates to an IC (Integrated Circuit) tag communication apparatus capable of communicating with a non-contact type IC tag. More specifically, the present invention relates to a printing apparatus having an IC tag communication function capable of reading and writing electrically with respect to a non-contact type IC tag such as an RFID (Radio Frequency Identification) tag embedded in a label or a printing sheet, and also capable of printing on a surface of the label or the printing sheet.

In a conventional IC tag communication apparatus such as a thermal printer, an antenna for writing and reading with respect to an IC tag is disposed on a transportation path of a recording medium in parallel to a thermal head. Accordingly, it is possible to communicate with the IC tag embedded in the recording medium using an electromagnetic connection between the IC tag and the antenna.

Patent Reference has disclosed a conventional printing apparatus having an IC tag processing function, in which it is possible to write and read with respect to the IC tag with one single antenna without extending the transportation path.

Patent Reference: Japanese Patent Publication No. 2007-203487

In the conventional IC tag communication apparatus disclosed in Patent Reference, however, when the recording medium is transported, it is difficult to effectively communicate with the IC tag.

In view of the problems described above, an object of the present invention is to provide an IC tag communication apparatus capable of solving the problems of the conventional IC tag communication apparatus.

Further objects and advantages of the invention will be apparent from the following description of the invention.

SUMMARY OF THE INVENTION

In order to attain the objects described above, according to an aspect of the present invention, an IC (Integrated Circuit) tag communication apparatus is capable of transporting a medium with an IC tag along a transportation path and communicating with the IC tag. The IC tag communication apparatus includes an antenna portion for communicating with the IC tag. Further, the transportation path includes a low dielectric region arranged to face the antenna portion.

According to the aspect of the present invention, it is possible to effectively communicate with the IC tag even when the medium is transported.

BRIEF DESCRIPTION OF THE DRAWINGS

FIGS. 1(a) to 1(c) are schematic views showing a thermal printer having an IC (Integrated Circuit) tag communication function according to a first embodiment of the present invention, wherein FIG. 1(a) is a front view of the thermal printer, FIG. 1(b) is a right side view of the thermal printer, and FIG. 1(c) is a plan view of the thermal printer;

FIGS. 2(a) and 2(b) are schematic perspective views showing the thermal printer having the IC tag communication function according to the first embodiment of the present invention, wherein FIG. 2(a) is a schematic perspective view showing the thermal printer in a state that a cover portion thereof is closed, and FIG. 2(b) is a schematic perspective view showing the thermal printer in a state that the cover portion thereof is opened;

FIGS. 4(a) to 4(c) are schematic views showing a thermal sensitive medium and a transportation path of the thermal printer having the IC tag communication function according to the first embodiment of the present invention, wherein FIG. 4(a) is a front view of the thermal printer, FIG. 4(b) is a right side view of the thermal sensitive medium and the transportation path of the thermal printer, and FIG. 4(c) is a plan view of the thermal sensitive medium and the transportation path of the thermal printer;

FIGS. 5(a) to 5(c) are schematic views showing the thermal printer having the IC tag communication function in a state that the thermal sensitive medium is partially omitted according to the first embodiment of the present invention, wherein FIG. 5(a) is a front view of the thermal printer, FIG. 5(b) is a right side view of the thermal printer, and FIG. 5(c) is a plan view of the thermal printer;

FIGS. 9(a) to 9(c) are schematic views showing a thermal printer having the IC tag communication function according to a second embodiment of the present invention, wherein FIG. 9(a) is a front view of the thermal printer, FIG. 9(b) is a right side view of the thermal printer, and FIG. 9(c) is a plan view of the thermal printer.

DETAILED DESCRIPTION OF PREFERRED EMBODIMENTS

Hereunder, embodiments of the present invention will be explained with reference to the accompanying drawings. It is noted that the drawings are presented for an explanation purpose only, and the present invention is not limited to the drawings.

First Embodiment

Figure 2A:
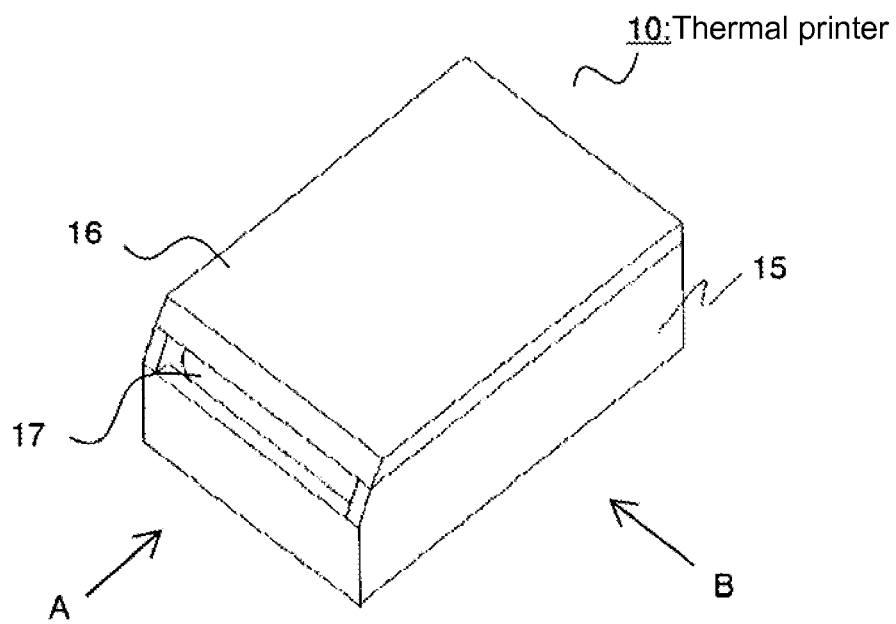
Figure 2B:
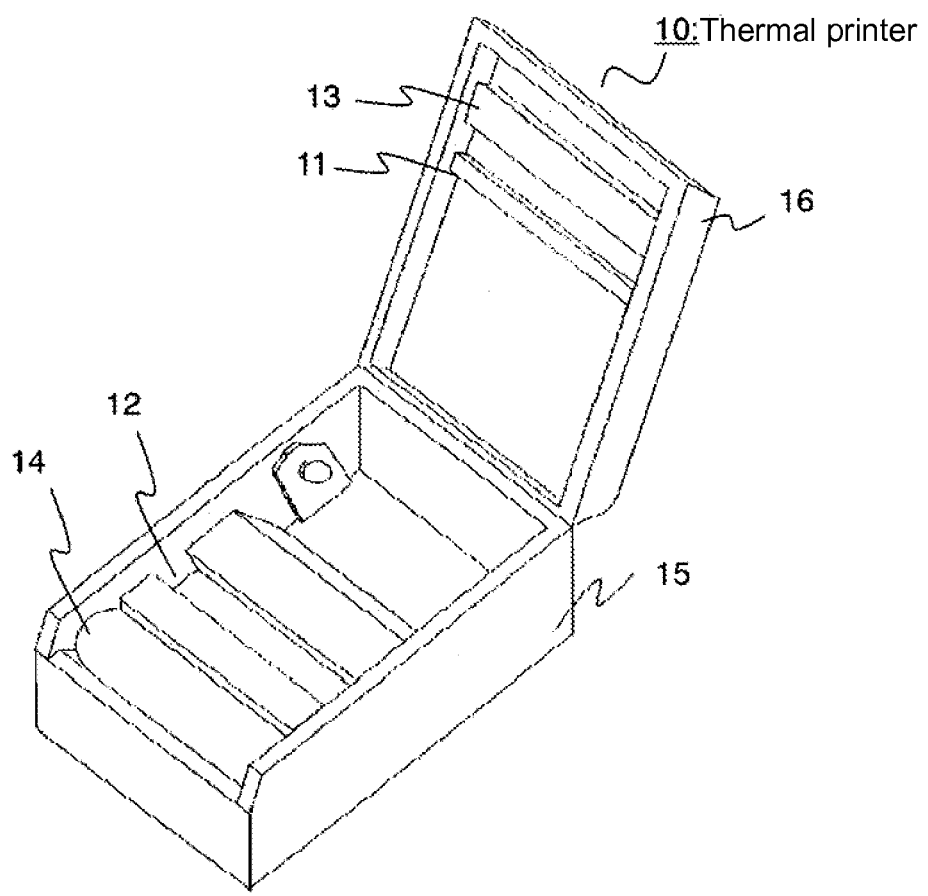

A first embodiment of the present invention will be explained. FIGS. 2(a) and 2(b) are schematic perspective views showing a thermal printer 10 having an IC (Integrated Circuit) tag communication function (described later) according to the first embodiment of the present invention. More specifically, FIG. 2(a) is a schematic perspective view showing the thermal printer 10 in a state that a cover portion 16 thereof is closed.

As shown in FIG. 2(a) the thermal printer 10 includes a housing portion 15 and the cover portion 16 attached to an end portion of the housing portion 15 to be freely opened and closed. In the state shown in FIG. 2(a), the cover portion 16 is closed to cover an upper portion of the housing portion 15. A sheet discharge outlet 17 is formed between the housing portion 15 and the cover portion 16 for discharging a thermal sensitive medium 100 (refer to FIG. 4, described later). In FIG. 2(a), an arrow direction A indicates a front direction, and an arrow direction B indicates a right side direction.

FIG. 2(b) is a schematic perspective view showing the thermal printer 10 in a state that the cover portion 16 thereof is opened. As shown in FIG. 2(b), a space is formed in the housing portion 15 at the furthest back side portion thereof for accommodating the thermal sensitive medium 100 as a medium such as a printing sheet. A transportation path made of an ABS (acrylonitrile butadiene styrene) resin is arranged in front of the space. The transportation path has a gap 12 having a specific width. A platen 14 having a circular cylindrical shape is disposed near the sheet discharge outlet 17 in a sheet width direction for transporting the thermal sensitive medium 100.

In the embodiment, an RFID antenna 11 and a thermal head 13 are arranged in the sheet width direction in the cover portion 16 from a backside thereof in this order. The RFID antenna 11 is provided for writing and reading informed with respect to an RFID tag 110 (refer to FIG. 4, described later) as a non-contact type IC tag. The thermal head 13 is provided for heating a contact portion thereof with the thermal sensitive medium 100, so that the thermal sensitive medium 100 is colored and printed. When the cover portion 16 is closed, the RFID antenna 11 is arranged to face the gap 12 through the transportation path, and the thermal head 13 is arranged to face the platen 14 through the transportation path.

Figure 1A:
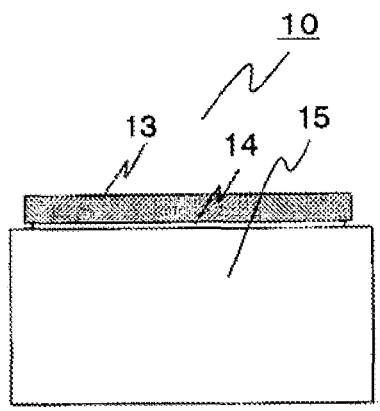
Figure 1B:
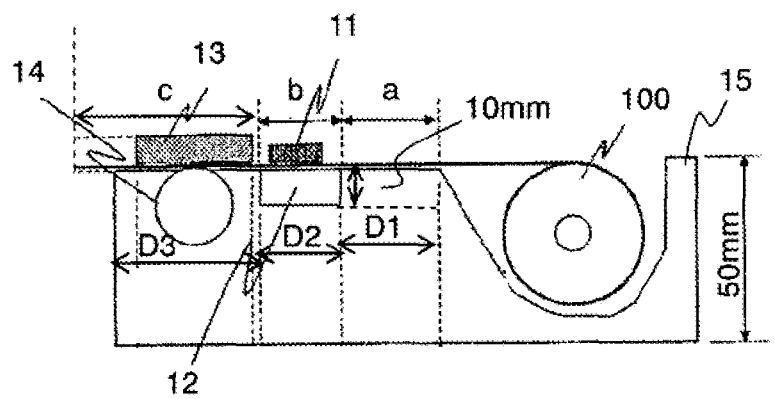
Figure 1C:
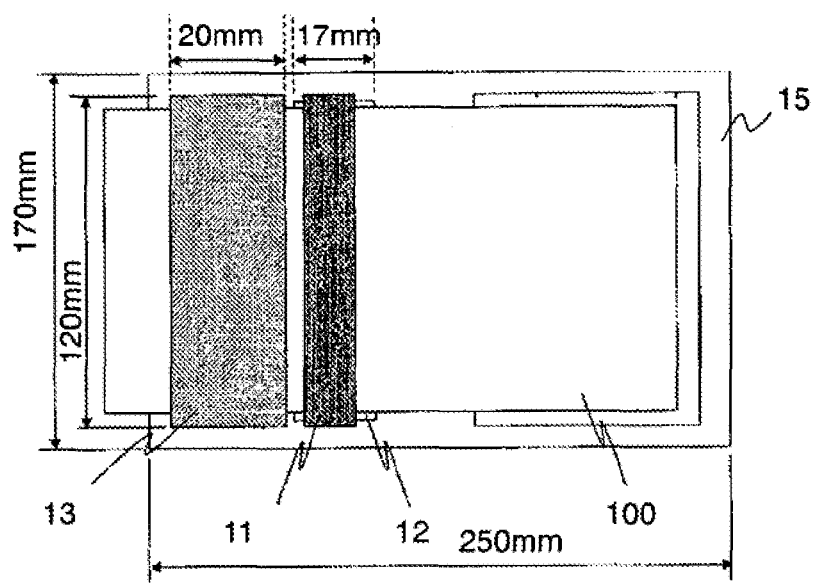

FIGS. 1(a) to 1(c) are schematic views showing the thermal printer 10 having the IC tag communication function according to the first embodiment of the present invention. More specifically, FIG. 1(a) is a front view of the thermal printer 10, FIG. 1(b) is a right side view of the thermal printer 10, and FIG. 1(c) is a plan view of the thermal printer 10. It is noted that the cover portion 16 of the thermal printer 10 is omitted in FIGS. 1(a) to 1(c).

As described above, the thermal printer 10 includes the housing portion 15 and the cover portion 16 (not shown in FIGS. 1(a) to 1(c)) for covering the housing portion 15. As shown in FIGS. 1(b) and 1(c), the thermal sensitive medium 100 is situated on a right side of the housing portion 15, and the housing portion 15 has a first transportation path area a, a space area b, and a third transportation path area c.

In the embodiment, the first transportation path area a has a flat plate shape, and is arranged on a left side of the thermal sensitive medium 100 as a high dielectric region. The space area b is arranged as a low dielectric region on a downstream side of the first transportation path area a in a medium transportation direction. The third transportation path area c is arranged as another high dielectric region on a downstream side of the space area b in the medium transportation direction. The gap 12 is arranged below the space area b, and the platen 14 with the circular cylindrical shape is arranged below the third transportation path area c.

In the embodiment, the cover portion 16 (not shown in FIGS. 1(a) to 1(c)) includes the RFID antenna 11 as the antenna portion and the thermal head 13. The RFID antenna 11 is arranged at a position corresponding to the space area b, and has a function of writing and reading information with respect to the RFID tag 110. The thermal head 13 is arranged at a position corresponding to the third transportation path area c, and has a function of coloring and printing the thermal sensitive medium 100 through heating.

In the embodiment, the first transportation path area a has a lower portion as one side portion thereof formed of an ABS resin as a first dielectric member. Further, the first transportation path area a has a length D1 as a first distance in the medium transportation direction.

In the embodiment, the space area b has a length D2 of 17 mm as a second distance in the medium transportation direction. Further, the space area b includes the gap 12 as the space portion having the second length D2 at a lower portion as one side portion thereof. Further, the space area b includes the RFID antenna 11 at an upper portion as the other side portion thereof, and the RFID antenna 11 is arranged within a width of the gap 12.

In the embodiment, the third transportation path area c has a lower portion as one side portion thereof formed of the ABS resin as a third dielectric member. Further, the third transportation path area c has a length D3 as a third distance in the medium transportation direction.

As described above, the first dielectric member constituting the first transportation path area a and the third dielectric member constituting the third transportation path area c are formed of the ABS resin (a dielectric constant of 2.4 to 4.1). The present invention is not limited to the ABS resin. The first dielectric member and the third dielectric member may be formed of a resin material such as an AS (acrylonitrile styrene) resin (a dielectric constant of 2.6 to 3.1), an ethylene resin (a dielectric constant of 2.2 to 2.3), an epoxy resin (a dielectric constant of 2.5 to 6.0), an acrylic resin (a dielectric constant of 2.7 to 4.5), an acrylonitrile resin (a dielectric constant of 3.5 to 4.5), a polyacetal resin (a dielectric constant of 3.6 to 3.7), nylon-6 (a dielectric constant of 3.5 to 4.0), nylon 66 (a dielectric constant of 3.4 to 3.5), and the like. Further, as far as a material has a high dielectric constant, the material is not limited to a resin material.

In the embodiment, the housing portion 15 has a height of 50 mm, a length of 170 mm in the medium width direction, and a length of 250 mm in the medium transportation direction. The thermal head 13 has a length of 20 mm in the medium transportation direction, and a length of 120 mm in the medium width direction. The gap 12 in the space area b has a length of 110 mm in the width direction, a width of 17 mm in the medium transportation direction, and a depth of 10 mm. The RFID antenna 11 has a width in the medium transportation direction smaller than the width of the gap 12, and has a length of 120 mm in the medium width direction. Further, the RFID antenna 11 is arranged within the width of the gap 12 as the space portion.

Figure 3:
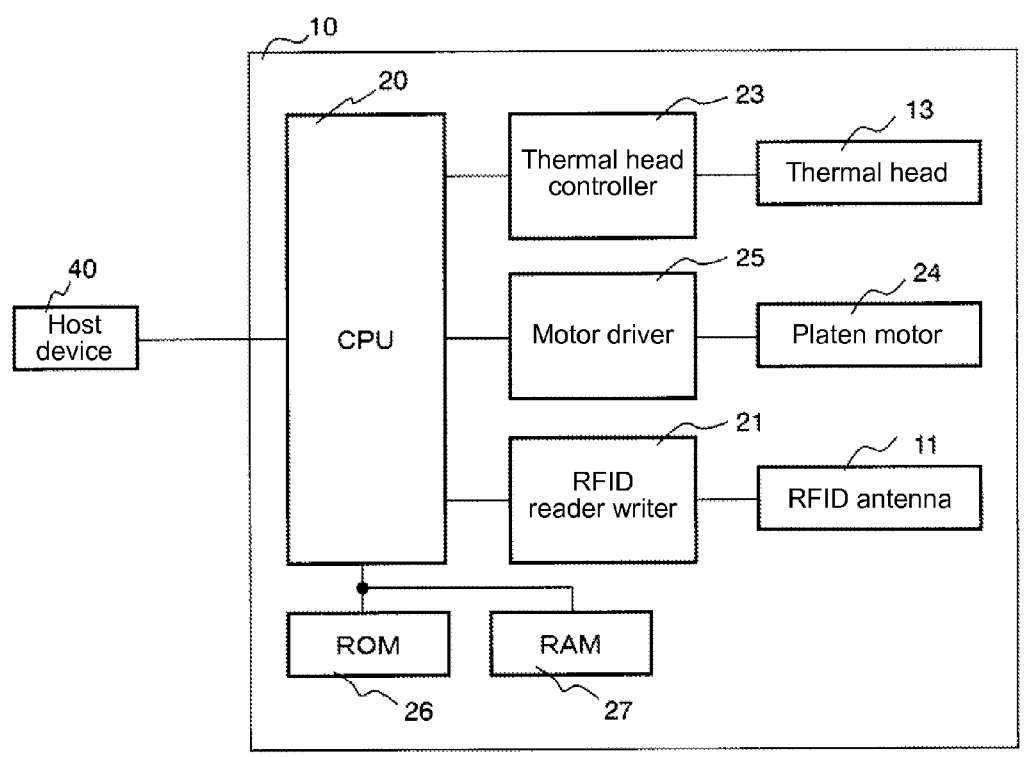
FIG. 3 is a block diagram showing a configuration of the thermal printer having the IC tag communication function according to the first embodiment of the present invention.

FIG. 3 is a block diagram showing a configuration of the thermal printer 10 having the IC tag communication function according to the first embodiment of the present invention.

As shown in FIG. 3, the thermal printer 10 is connected to a host device 40 to be capable of communicating with the host device 40. Further, the thermal printer 10 includes a central processing unit (referred to as a CPU) 20; a non-volatile memory (referred to as an ROM) 26; a volatile memory (referred to as an RAM) 27; a thermal head controller 23 for controlling the thermal head 13; a motor driver 25 for controlling a platen motor 24; and an RFID reader writer 21 for controlling the RFID antenna 11.

Figure 4A:
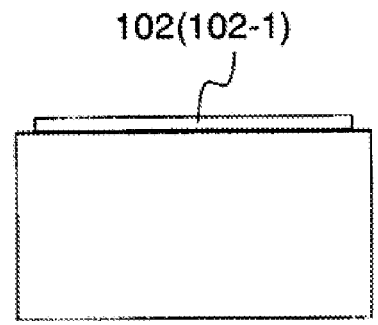
Figure 4B:
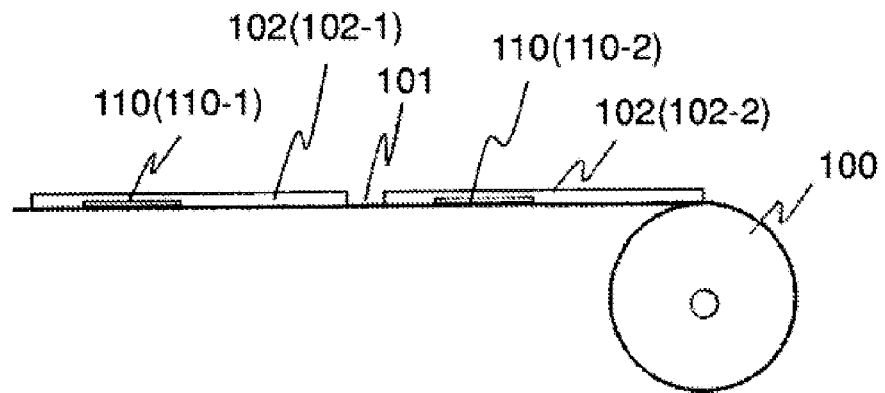
Figure 4C:
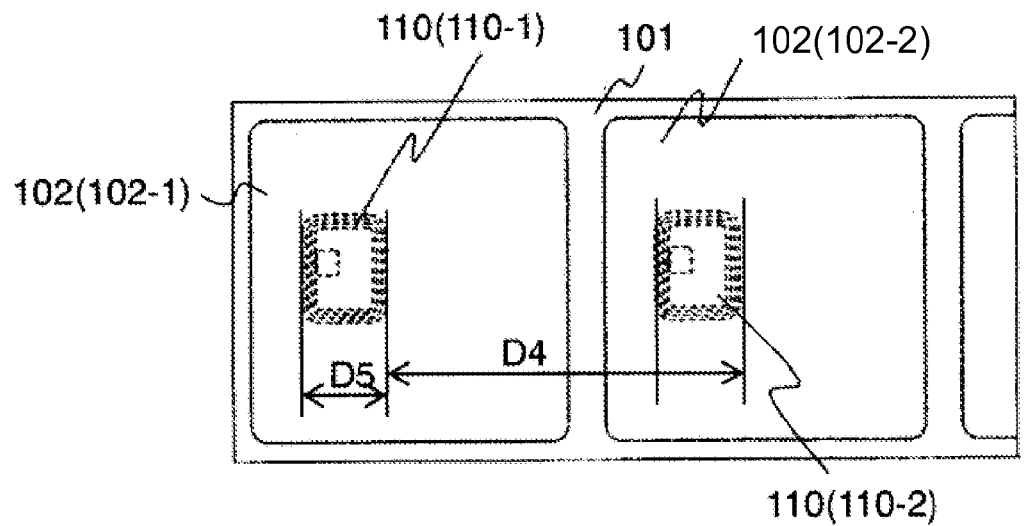

FIGS. 4(a) to 4(c) are schematic views showing the thermal sensitive medium 100 and the transportation path of the thermal printer 10 having the IC tag communication function according to the first embodiment of the present invention. More specifically, FIG. 4(a) is a front view of the thermal printer 10, FIG. 4(b) is a right side view of the thermal sensitive medium 100 and the transportation path of the thermal printer 10, and FIG. 4(c) is a plan view of the thermal sensitive medium 100 and the transportation path of the thermal printer 10.

In the embodiment, the thermal sensitive medium 100 includes a releasing paper sheet 101 having a long length as a base member wound in a roll shape and labels 102 (102-1, 102-2, . . . ) having a substantially square shape sequentially attached to the releasing paper sheet 101. Each of the labels 102 has a surface coated with a thermal sensitive agent. Accordingly, when heat is applied to each of the labels 102, each of the labels 102 is colored.

In the embodiment, each of the labels 102 further includes the RFID tag 110 embedded therein at a center portion thereof on a lightly left side thereof. Accordingly, the RFID tag 110 is capable of transmitting and receiving information with respect to the RFID antenna 11 of the thermal printer 10 through an electromagnetic wave. The RFID tags 110 are arranged apart with an interval D4 (for example, 30 mm) as a fourth distance in the medium transportation direction, and are formed in an antenna shape having a length D5 (for example, 10 mm) as a fifth distance in the medium transportation direction.

In the embodiment, it is possible to store a large quantity of information in the RFID tag 110. Accordingly, it is possible to read and write information such as a product identification code, product information and the like using a radio wave. When the RFID tags 110 are embedded in the labels 102, and information is stored in the RFID tags 110, it is possible to utilize the information thus stored for accounting and administrating a product with the label 102 attached thereto, or for safety control of the product.

It is noted that the information stored in the RFID tag 110 is electric information. Accordingly, human cannot directly access to the information stored in the RFID tag 110. To this end, it is configured such that the RFID tags 110 are embedded in the labels 102, and a part of the information stored in the RFID tags 110 is printed on the labels 102 as text information and the like, so that human can recognize the information. Further, a part or all of the information stored in the RFID tags 110 may be printed on the labels 102 as a bar code, a two-dimensional bar code, and the like. Accordingly, even when the RFID tag 110 cannot be read due to malfunction and the like, it is possible to read necessary information using a bar code reader and the like.

In the embodiment, the thermal printer 10 has the function of writing the information into the RFID tag 110 with respect to the label 102 as the printing sheet with the RFID tag 110 embedded therein. Further, the thermal printer 10 has the function of printing on the label 102. Accordingly, the thermal printer 10 is an example of the printing apparatus with the IC tag communication function capable of performing the dual functions.

Figure 5A:
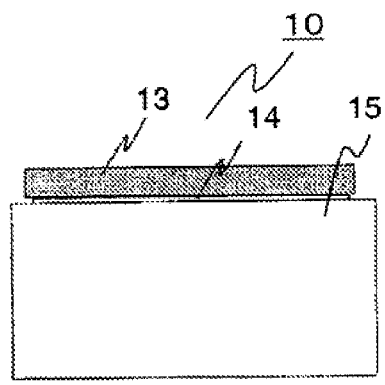
Figure 5B:
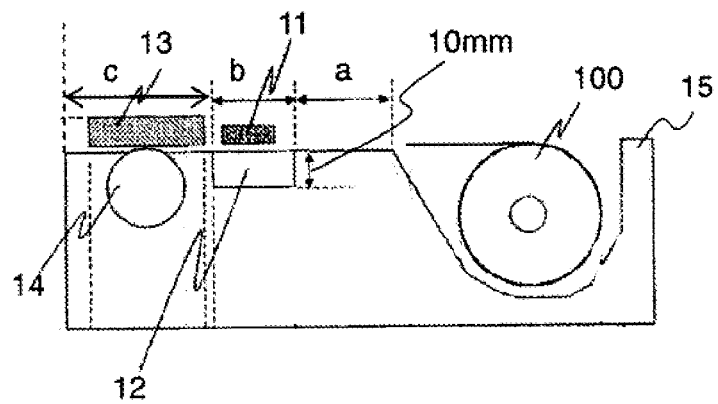
Figure 5C:
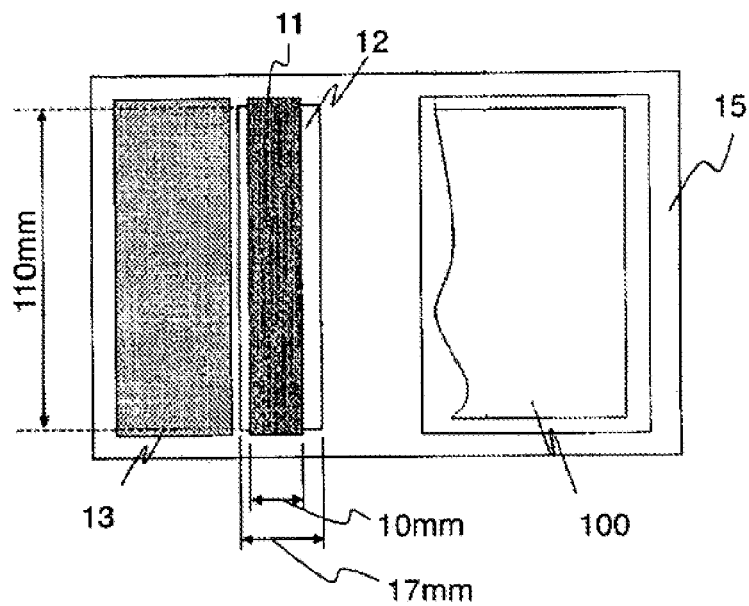

FIGS. 5(a) to 5(c) are schematic views showing the thermal printer 10 having the IC tag communication function in a state that the thermal sensitive medium 100 is partially omitted according to the first embodiment of the present invention. More specifically, FIG. 5(a) is a front view of the thermal printer 10, FIG. 5(b) is a right side view of the thermal printer 10, and FIG. 5(c) is a plan view of the thermal printer 10. It is noted that the cover portion 16 of the thermal printer 10 is omitted in FIGS. 5(a) to 5(c).

As described above, the gap 12 in the space area b has the length of 110 mm in the medium width direction, the width of 17 mm in the medium transportation direction, and the depth of 10 mm. Further, the RFID antenna 11 has the width of 10 mm in the medium transportation direction.

In the embodiment, the labels 102 move over the medium transportation path, and are discharged after passing by the lower portion of the RFID antenna 11 and the lower portion of the thermal head 13. As described above, the medium transportation path is formed of the dielectric members. More specifically, the medium transportation path is formed of the ABS resin having the dielectric constant of 2.4 to 4.1. The dielectric member has dielectric property more dominant than conductive property thereof, and has a wide band gap. Accordingly, the dielectric member becomes an insulation member relative to a direct current voltage.

In the embodiment, the gap 12 without the dielectric member is arranged below the RFID antenna 11 and on one side of the space area b, so that the gap 12 is situated between the RFID tag 110 and the dielectric member. The gap 12 is not provided with the dielectric member, and is filled with air having a low dielectric constant (1.00059).

When it is necessary to increase strength of the medium transportation path, the gap 12 below the RFID antenna 11 and on the one side of the space area b may be filled with a low dielectric constant material as a second dielectric member. Accordingly, the gap 12 filled with the second dielectric member functions as the low dielectric region of the medium transportation path. The second dielectric member may be formed of the low dielectric constant material such as polystyrene (a dielectric constant of 2.4 to 2.6), polypropylene (a dielectric constant of 2.25), high density polyethylene (a dielectric constant of 2.2), and the like.

When the RFID tag 110 approaches the dielectric member, the frequency property of the antenna disposed in the RFID tag 110 is shifted to a lower frequency. When the frequency property is shifted, a sensitivity of the RFID tag 110 at a target frequency f0 used in normal communication tends to decrease, thereby becoming more susceptible to external noises. Accordingly, a communication error tends to occur more frequently.

In the embodiment, the gap 12 is arranged below the RFID antenna 11 and on the one side of the space area b. With the configuration, when the RFID antenna 11 communicates with the RFID tag 110 in the space area b, it is possible to properly perform the communication while minimizing the shift of the frequency property of the antenna disposed in the RFID tag 110.

In the embodiment, the gap 12 has the length D2 in the medium transportation direction greater than the interval D4 of the RFID tag 110. Accordingly, it is possible to prevent cross communication between the RFID antenna 11 and the RFID tag 110 thanks to the gap 12.

In the embodiment, it is preferred that the length D2 of the gap 12 in the medium transportation direction is greater than the length D5 of the antenna shape of the RFID tag 110, so that it is possible to securely minimize the shift of the frequency property of the antenna disposed in the RFID tag 110. It is noted that, however, even when the length D2 of the gap 12 in the medium transportation direction is smaller than the length D5 of the antenna shape of the RFID tag 110, it is possible to obtain the effect of minimizing the shift of the frequency property.

An operation of the thermal printer 10 will be explained next with reference to FIG. 3. When the CPU 20 receives the print data from the host device 40 connected to the thermal printer 10 capable of communicating, the CPU 20 transmits the print data to the thermal head controller 23. Further, the CPU 20 controls the motor driver 25 to transport the thermal sensitive medium 100 in a controlled manner.

In the next step, when the thermal head controller 23 receives the print data from the CPU 20, the thermal head controller 23 converts the print data to a format compatible with the thermal head 13, and transmits the converted data to the thermal head 13. Accordingly, the thermal head 13 heats a heating element thereof specified in the converted data transmitted from the thermal head controller 23, so that the print data is printed on the thermal sensitive medium 100.

In the next step, when the motor driver 25 receives an instruction such as a rotational speed and a rotational amount from the CPU 20, the motor driver 25 drives the platen motor 24 to rotate the platen 14. It is noted that a program and font data operated with the CPU 20 are stored in the ROM 26, and the print data necessary to be temporarily stored is stored in the RAM 27. Further, the CPU 20 controls the RFID reader writer 21 to receive and transmit data with respect to the RFID tag 110 through the electromagnetic communication. The electromagnetic communication with the RFID tag 110 is performed through the RFID antenna 11.

Figure 6:
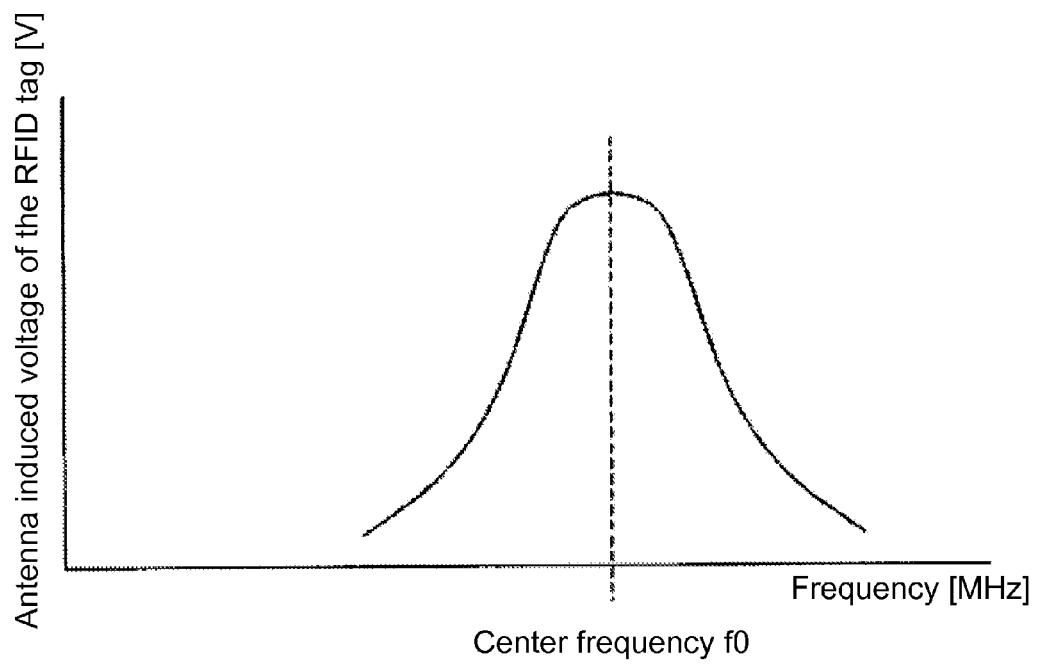
FIG. 6 is a graph showing a relationship between a frequency and an antenna induced voltage of an RFID tag in a space area b of the thermal printer according to the first embodiment of the present invention.

FIG. 6 is a graph showing a relationship between a frequency and an antenna induced voltage of the RFID tag 110 in the space area b of the thermal printer 10 according to the first embodiment of the present invention. In FIG. 6, the horizontal axis represents the frequency, and the vertical axis represents the antenna induced voltage of the RFID tag 110.

As shown in FIG. 6, when the dielectric member does not exist near the RFID tag 110, the antenna disposed in the RFID tag 110 exhibits the frequency property represented with a bold solid line with a center frequency f0. The antenna induced voltage of the RFID tag 110 becomes a maximum value around the center frequency f0. Accordingly, the RFID reader writer 21 and the RFID antenna 11 are configured to communicate with the RFID tag 110 at the center frequency f0.

Figure 7:
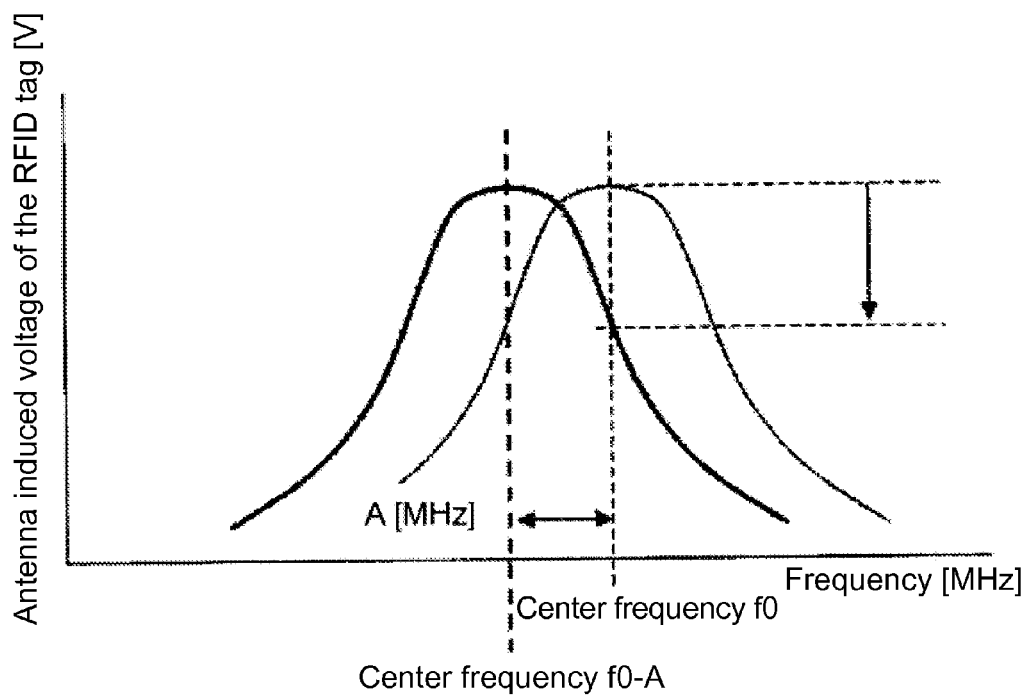
FIG. 7 is a graph showing a relationship between the frequency and the antenna induced voltage of the RFID tag in the space area b and a transportation path area a of the thermal printer according to the first embodiment of the present invention.

FIG. 7 is a graph showing a relationship between the frequency and the antenna induced voltage of the RFID tag in the space area b and the first transportation path area a of the thermal printer 10 according to the first embodiment of the present invention. In FIG. 7, the horizontal axis represents the frequency, and the vertical axis represents the antenna induced voltage of the RFID tag 110.

As shown in FIG. 7, when the dielectric member does not exist near the RFID tag 110 like the space area b, the antenna disposed in the RFID tag 110 exhibits the frequency property represented with a thin solid line. When the dielectric member does exist near the RFID tag 110 like the first transportation path area a, the antenna disposed in the RFID tag 110 exhibits the frequency property represented with a bold solid line. As the bold solid line indicates, the frequency property of the antenna disposed in the RFID tag 110 is shifted by a shift amount A (MHz) toward the lower frequency side due to the influence of the dielectric member near the RFID tag 110 on the upper side or the lower side thereof. Accordingly, the center frequency becomes a value of f0−A (MHz).

When the center frequency is shifted by the shift amount A (MHz), if the communication is conducted at the frequency f0, the induced voltage of the antenna disposed in the RFID tag 110 is lowered. Accordingly, due to the lowered induced voltage, it may be difficult to conduct the communication, thereby causing a problem such as a communication error and the like. It is noted that the shift amount A (MHz) depends on the type of the RFID tag 110.

In the embodiment, it is configured such that the gap 12 is disposed at the location where the RFID antenna 11 starts communicating with the RFID tag 110 while the thermal sensitive medium 100 is transported. Further, the gap 12 is disposed in the space area b of the medium transportation path, and is not disposed in the first transportation path area a. In other words, in the first transportation path area a, the RFID tag 110 is situated near the dielectric member constituting the medium transportation path. As a result, the frequency property of the antenna disposed in the RFID tag 110 is shifted in the first transportation path area a, and it may be difficult to communicate with the RFID antenna 11.

In the embodiment, please note that the RFID tag 110 situated in the first transportation path area a is not the one communicating with the RFID antenna 11 currently, but the one to be communicated with the RFID antenna 11 next. As described above, when the RFID tag 110, that is not the communication target, is situated in the first transportation path area a, the frequency property of the antenna disposed in the RFID tag 110 is shifted, and it may be difficult to communicate with the RFID antenna 11. Accordingly, it is possible to prevent the RFID antenna 11 from communicating with the RFID tag 110 to be communicated with the RFID antenna 11 next.

As described above, in the embodiment, the first transportation path area a has the length D1 in the medium transportation direction greater than the length D5 of the antenna shape of the RFID tag 110. Further, the third transportation path area c has the length D3 in the medium transportation direction greater than the length D5 of the antenna shape of the RFID tag 110. Accordingly, when the RFID tag 110 is situated in the first transportation path area a or the third transportation path area c, the frequency property of the antenna disposed in the RFID tag 110 is shifted, and it is relatively difficult to communicate with the RFID antenna 11. Accordingly, it is possible to prevent the RFID antenna 11 from communicating with the RFID tag 110 that is not the communication target at the moment.

Figure 8:
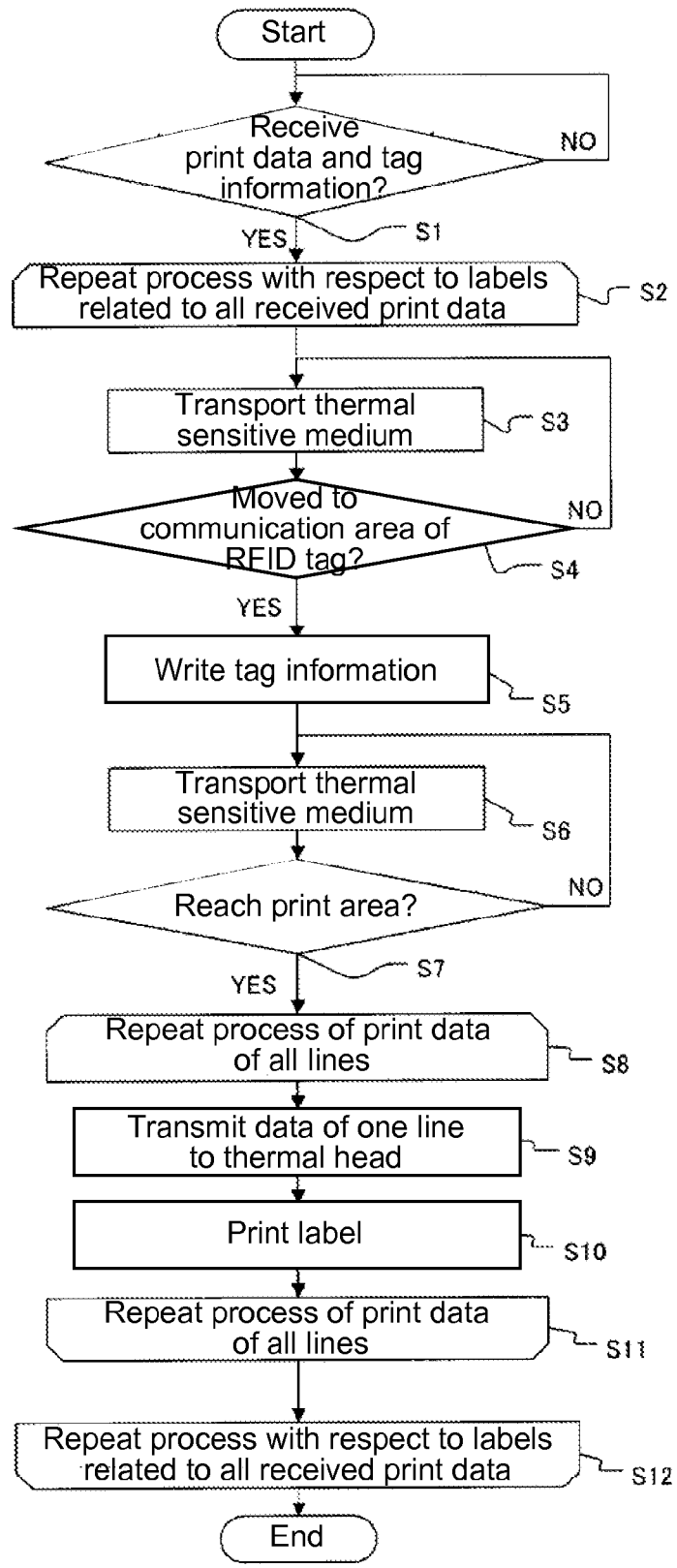
FIG. 8 is a flow chart showing an operation of the thermal printer having the IC tag communication function according to the second embodiment of the present invention.

FIG. 8 is a flow chart showing the operation of the thermal printer 10 having the IC tag communication function according to the second embodiment of the present invention.

In step S1, when the operation of the thermal printer 10 starts, the thermal printer 10 waits and determines whether the thermal printer 10 receives the print data and the tag information from the host device 40. In step S2, when the thermal printer 10 receives the print data and the tag information from the host device 40, the thermal printer 10 repeats the process from step S2 to S14 with respect to the labels 102 related to all of the print data thus received.

In step S3, the thermal printer 10 transports the thermal sensitive medium 100. In step S4, the thermal printer 10 determines whether the thermal printer 10 moves the label 102 to the communication area of the RFID tag 110. In step S5, the thermal printer 10 communicates with the RFID tag 110 of the label 102, so that the thermal printer 10 writes the tag information related to the label 102 to the RFID tag 110.

In step S6, the thermal printer 10 transports the thermal sensitive medium 100. In step S7, the thermal printer 10 determines whether the label 102 reaches the print area. When the thermal printer 10 transports the label 102 to the print area, the thermal printer 10 repeats the process of the print data of all lines with respect to the label 102.

In step S9, the thermal printer 10 transmits data of one line to the thermal head 13. In step S10, the thermal printer 10 controls the thermal head 13 to heat, so that the label 102 on the thermal sensitive medium 100 is printed. In step S11, the thermal printer 10 completes the process of the print data of all lines. In step S12, the thermal printer 10 repeats the process on the label 102 related to all of the print data thus received, thereby completing the process shown in FIG. 8.

As described above, in the embodiment, the thermal printer 10 is capable of attaining the following effects. First, the gap 12 is disposed in the medium transportation path. Accordingly, it is possible to communicate at the most suitable frequency, thereby obtaining stable communication.

Second, the dielectric member has the influence depending on the type of the RFID tag 110. Accordingly, if the RFID tag 110 receives a large influence from the dielectric member, it may be difficult to use the RFID tag 110. In the embodiment, however, with the configuration described above, it is possible to use the RFID tag 110 in such a case.

Third, in the embodiment, the first transportation path area a is disposed on the upstream side of the gap 12 in the medium transportation direction, and the third transportation path area c is disposed on the downstream side of the gap 12 in the medium transportation direction. Further, the first transportation path area a and the third transportation path area c are formed of the dielectric members. It is configured such that the first transportation path area a has the length D1 and the third transportation path area c has the length D3 both greater than the length D5 of the antenna shape of the RFID tag 110. Accordingly, it is possible to securely shift the frequency property of the antenna disposed in the RFID tag 110 that is not the communication target, thereby preventing miscommunication.

Second Embodiment

A second embodiment of the present invention will be explained next.

In the first embodiment, the frequency property of the antenna disposed in the RFID tag 110 is shifted when the RFID tag 110 is situated in the first transportation path area a including the dielectric member. However, when the thermal sensitive medium 100 is transported away from the dielectric member further, the frequency property of the antenna disposed in the RFID tag 110 is shifted to a lesser extent. Further, depending on the type, the RFID tag 110 may receive a less influence from the dielectric member. In this case, the thermal printer 10 may mistakenly communicate with the RFID tag 110 that is not the communication target. In the second embodiment, a thermal printer 10A is configured such that the problem described above is minimized.

Figure 9A:
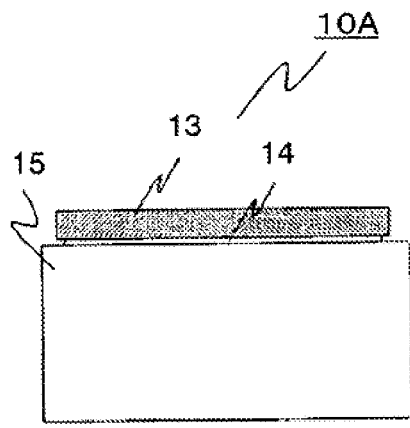
Figure 9B:
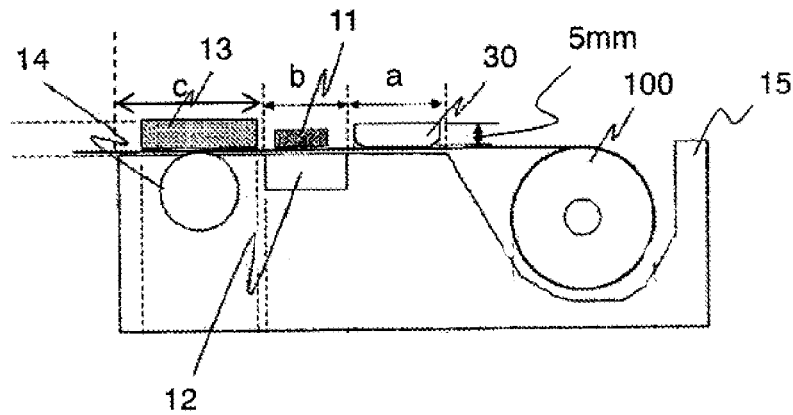
Figure 9C:
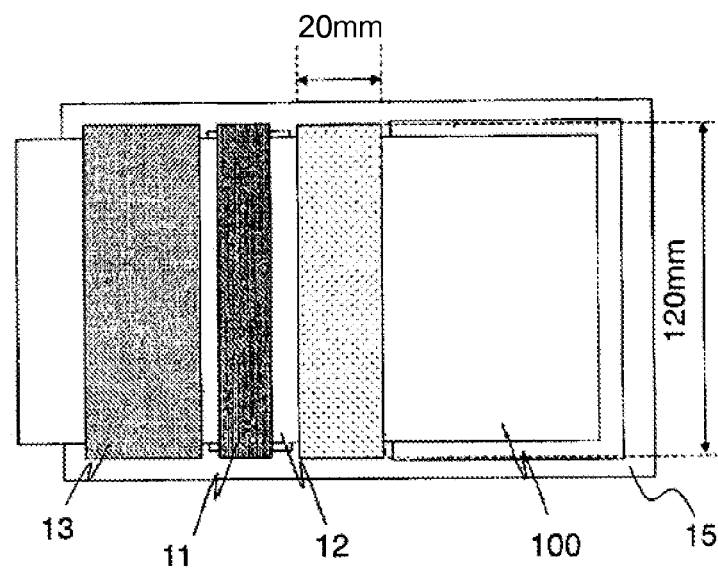

FIGS. 9(a) to 9(c) are schematic views showing the thermal printer 10A having the IC tag communication function according to the second embodiment of the present invention. More specifically, FIG. 9(a) is a front view of the thermal printer 10A, FIG. 9(b) is a right side view of the thermal printer 10A, and FIG. 9(c) is a plan view of the thermal printer 10A. It is noted that the cover portion 16 of the thermal printer 10A is omitted in FIGS. 9(a) to 9(c). Components of the thermal printer 10A similar to those of the thermal printer 10 shown in FIGS. 1(a) to 1(c) are designated with the same reference numerals.

In the second embodiment, in addition to the configuration of the thermal printer 10 in the first embodiment, the thermal printer 10A further includes a block member 30 as a medium guide portion and a fourth dielectric member disposed in the cover portion 16 (not shown in FIGS. 9(a) to 9(c)). The block member 30 is disposed above the first transportation path area a as the one side of the first transportation path area a, so that the thermal sensitive medium 100 is transported between the block member 30 and the first dielectric member constituting the medium transportation path. It is noted that the block member 30 is arranged to prevent the thermal sensitive medium 100 from warping away from the medium transportation path.

In the second embodiment, the block member 30 has a length of 20 mm in the medium transportation direction, a height of 5 mm, and a length of 120 mm in the medium width direction. Further, it is preferred that the block member 30 as the fourth dielectric member is formed of a material with a high dielectric constant, similar to the first dielectric member and the third dielectric member.

Figure 10:
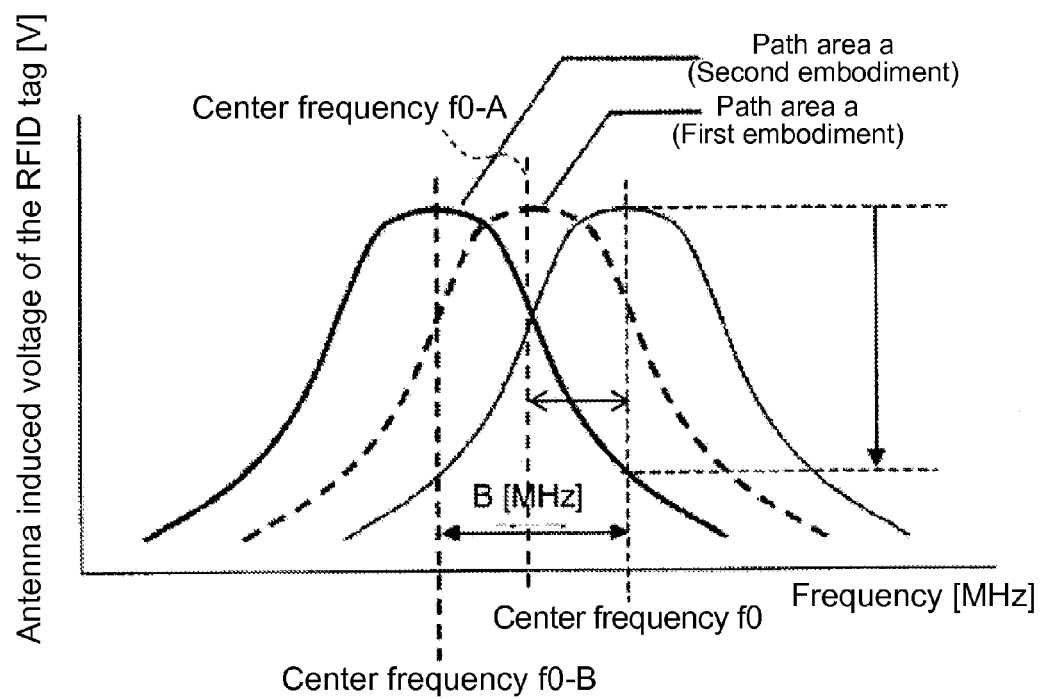
FIG. 10 is a graph showing a relationship between the frequency and the antenna induced voltage of the RFID tag in a transportation path area a of the thermal printer according to the second embodiment of the present invention.

An operation of the thermal printer 10A will be explained next. FIG. 10 is a graph showing a relationship between the frequency and the antenna induced voltage of the RFID tag 110 in the first transportation path area a of the thermal printer 10A according to the second embodiment of the present invention. In FIG. 10, the horizontal axis represents the frequency, and the vertical axis represents the antenna induced voltage of the RFID tag 110.

As shown in FIG. 10, when the dielectric member does not exist near the RFID tag 110 like the space area b, the antenna disposed in the RFID tag 110 exhibits the frequency property represented with a thin solid line. When the ABS resin as the first dielectric member does exist below on the one side of the first transportation path area a in the first embodiment, the antenna disposed in the RFID tag 110 exhibits the frequency property represented with a hidden line. When the first dielectric member does exist below on the one side of the first transportation path area a, and the block member 30 as the fourth dielectric member exists above on the other side of the first transportation path area a in the second embodiment, the antenna disposed in the RFID tag 110 exhibits the frequency property represented with a bold solid line.

As shown in FIG. 10, when the block member 30 is provided as the fourth dielectric member in addition to the first transportation path area a, as the bold solid line indicates, the frequency property of the antenna disposed in the RFID tag 110 is shifted by a shift amount B (MHz) with respect to the RFID tag 110. Accordingly, as opposed to the first embodiment that only the first transportation path area a is provided, the frequency property of the antenna disposed in the RFID tag 110 is shifted to a larger extent by a shift amount (B−A) (MHz).

Further, the center frequency becomes a value of f0−B (MHz). Accordingly, when the RFID tag 110 is communicated at the frequency of f0, the induced voltage of the antenna disposed in the RFID tag 110 is further lowered, and it may be difficult to communicate with the RFID antenna 11. Accordingly, it is possible to prevent the RFID antenna 11 from communicating with the RFID tag 110 that is not the communication target at that moment.

As described above, in the second embodiment, the thermal printer 10 is capable of attaining the following effects. First, the block member 30 is disposed for preventing the thermal sensitive medium 100 from warping away from the medium transportation path. Accordingly, it is possible to securely shift the frequency property of the antenna disposed in the RFID tag 110 toward the low frequency side in the first transportation path area a. As a result, when the RFID tag 110 is communicated at the frequency of f0 (MHz), it is possible to securely decrease the antenna induced voltage of the RFID tag 110.

Second, the block member 30 is added to the configuration of the thermal printer 10 in the first embodiment. Accordingly, it is possible to further shift the frequency property of the antenna disposed in the RFID tag 110 toward the low frequency side in the first transportation path area a as compared with the first embodiment. As a result, when the RFID tag 110 is communicated at the frequency of f0 (MHz), it is possible to further decrease the antenna induced voltage of the RFID tag 110. Therefore, it is possible to prevent the RFID antenna 11 from communicating with the RFID tag 110 that is not the communication target further securely.

It is noted that the present invention is not limited to the first embodiment and the second embodiment, and may be modified as follows.

In the first embodiment and the second embodiment, the thermal printer 10 includes the RFID reader writer 21 for reading and writing the data. The present invention is not limited thereto, and may be applicable to other apparatus having the RFID writing and reading function such as an inkjet type printer, a light emitting diode type printer, a laser type printer, and the like. Further, the present invention may be applicable to an RFID writing and reading apparatus without the printing function.

In the first embodiment, the first dielectric member is disposed at the lower portion of the first transportation path area a, and the third dielectric member is disposed at the lower portion of the third transportation path area c. The present invention is not limited to the configuration, and the first dielectric member may be disposed at the upper portion of the first transportation path area a, and the third dielectric member may be disposed at the upper portion of the third transportation path area c.

In the first embodiment and the second embodiment, the thermal printer 10 is configured to print on the thermal sensitive medium 100 with the sheet shape including the RFID tag 110. The present invention is not limited to the configuration, and may be applicable to an apparatus capable of writing and reading the RFID tag 110 embedded in a card shape medium.

In the second embodiment, the block member 30 formed of the dielectric member is disposed on the upstream side of the RFID antenna 11 in the medium transportation direction above and the one side of the first transportation path area a. Accordingly, it is possible to prevent the RFID antenna 11 from mistakenly communication with the RFID tag 110 that is not the communication target. The present invention is not limited to the configuration, and the thermal head 13 disposed on the downstream side of the RFID antenna 11 in the medium transportation direction above the third transportation path area c may be formed of a fifth dielectric member.

Alternatively, the fifth dielectric member may be disposed to surround the thermal head 13. With the configuration, it is possible to further shift the frequency property of the antenna disposed in the RFID tag 110 in the third transportation path area c, as compared with the first embodiment and the second embodiment. Accordingly, it is possible to prevent the RFID antenna 11 from communicating with the RFID tag 110 to which the information is already written. Similar to the first, third, and fourth dielectric members, it is preferred that the fifth dielectric member is formed of a material having a high dielectric constant In the first embodiment and the second embodiment, the dielectric members may be formed of a mixture of a high dielectric material and a magnetic material such as ferrite, carbon, and the like. When the dielectric members are formed of such a material, it is possible to absorb unnecessary external electromagnetic wave, thereby making it possible to stably communicate with the RFID tag 110.

The disclosure of Japanese Patent Application No. 2010-252618, filed on Nov. 11, 2010, is incorporated in the application by reference.

While the invention has been explained with reference to the specific embodiments of the invention, the explanation is illustrative and the invention is limited only by the appended claims.

What is claimed is:

1. An IC (Integrated Circuit) tag communication apparatus that communicates with an IC tag, comprising:
    an antenna portion for communicating with the IC tag;
    a transportation path for transporting a medium with the IC tag embedded therein;
    a first high dielectric region;
    a low dielectric region disposed adjacent to the first high dielectric region in a transportation direction of the medium and arranged to face the antenna portion so that the medium is transported between the low dielectric region and the antenna portion; and
    a second high dielectric region disposed adjacent to the low dielectric region in the transportation direction of the medium.

2. The IC tag communication apparatus according to claim 1, wherein said low dielectric region has a length greater than that of the IC tag in a transportation direction of the medium.

3. The IC tag communication apparatus according to claim 1, wherein said low dielectric region has a width greater than that of the IC tag.

4. The IC tag communication apparatus according to claim 1, further comprising a medium guide portion disposed to face the first high dielectric region.

5. An IC (Integrated Circuit) tag communication apparatus that communicates with an IC tag, comprising:
    an antenna portion for communicating with the IC tag;
    a transportation path for transporting a medium with the IC tag embedded therein;
    a low dielectric region arranged to face the antenna portion so that the medium is transported between the low dielectric region and the antenna portion; and
    a high dielectric region disposed adjacent to the low dielectric region in a transportation direction of the medium, said high dielectric region having a dielectric constant higher than that of the low dielectric region.

6. The IC tag communication apparatus according to claim 5, wherein said low dielectric region has a length greater than that of the IC tag in a transportation direction of the medium.

7. The IC tag communication apparatus according to claim 5, wherein said low dielectric region has a width greater than that of the IC tag.

8. The IC tag communication apparatus according to claim 5, further comprising a medium guide portion disposed to face the high dielectric region.

9. The IC tag communication apparatus according to claim 5, wherein said high dielectric region is disposed on each of both sides of the low dielectric region in the transportation direction.

* * * * *